United States Patent [19]

Makabe

[11] Patent Number: 5,069,319
[45] Date of Patent: Dec. 3, 1991

[54] CONTROL SYSTEM FOR A CLUTCH OF A MOTOR VEHICLE

[75] Inventor: Mitsuru Makabe, Mitaka, Japan
[73] Assignee: Fuji Jukogyo Kabushiki Kaisha, Tokyo, Japan
[21] Appl. No.: 512,750
[22] Filed: Apr. 20, 1990

[30] Foreign Application Priority Data

Apr. 28, 1989 [JP] Japan .................. 1-111733

[51] Int. Cl.⁵ .......................................... B60K 41/28
[52] U.S. Cl. .............................. 192/0.052; 192/0.076; 192/0.092; 192/3.58; 192/103 R
[58] Field of Search ................ 192/0.052, 0.076, 0.033, 192/0.092, 3.58, 0.075, 103 R

[56] References Cited

U.S. PATENT DOCUMENTS

| | | | |
|---|---|---|---|
| 4,714,145 | 12/1987 | Kurihara et al. .................. | 192/0.052 |
| 4,765,450 | 8/1988 | Kurihara et al. ............. | 192/0.076 X |
| 4,846,321 | 7/1989 | Ohkumo ....................... | 192/0.076 X |
| 4,854,433 | 8/1989 | Tellert .......................... | 192/0.052 X |
| 4,926,994 | 5/1990 | Koshizawa et al. ......... | 192/0.052 X |

FOREIGN PATENT DOCUMENTS 59-124438 7/1984 Japan .
62-47742 10/1987 Japan .

Primary Examiner—Allan D. Herrmann
Assistant Examiner—Andrea Pitts
Attorney, Agent, or Firm—Martin A. Farber

[57] ABSTRACT

A system and method for controlling a friction clutch of a motor vehicle wherein conditions of the clutch, an engine, a transmission, and the vehicle are detected. A desired shifting speed for shifting a pressure plate of the clutch is provided based on the detected conditions. An actual shifting speed is estimated based on the desired shifting speed, and a position of the pressure plate is obtained by integrating the actual shifting speed. Speed of the pressure plate is controlled based on the position of the pressure plate.

7 Claims, 14 Drawing Sheets

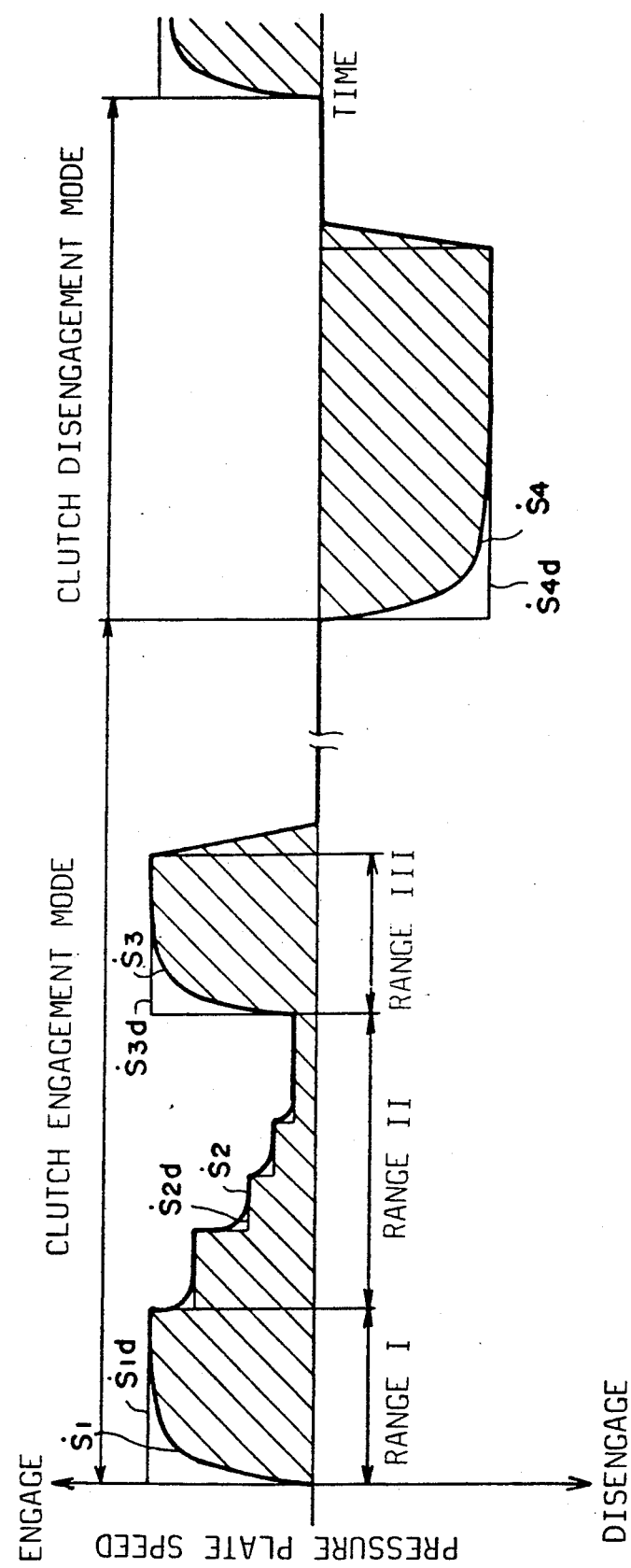

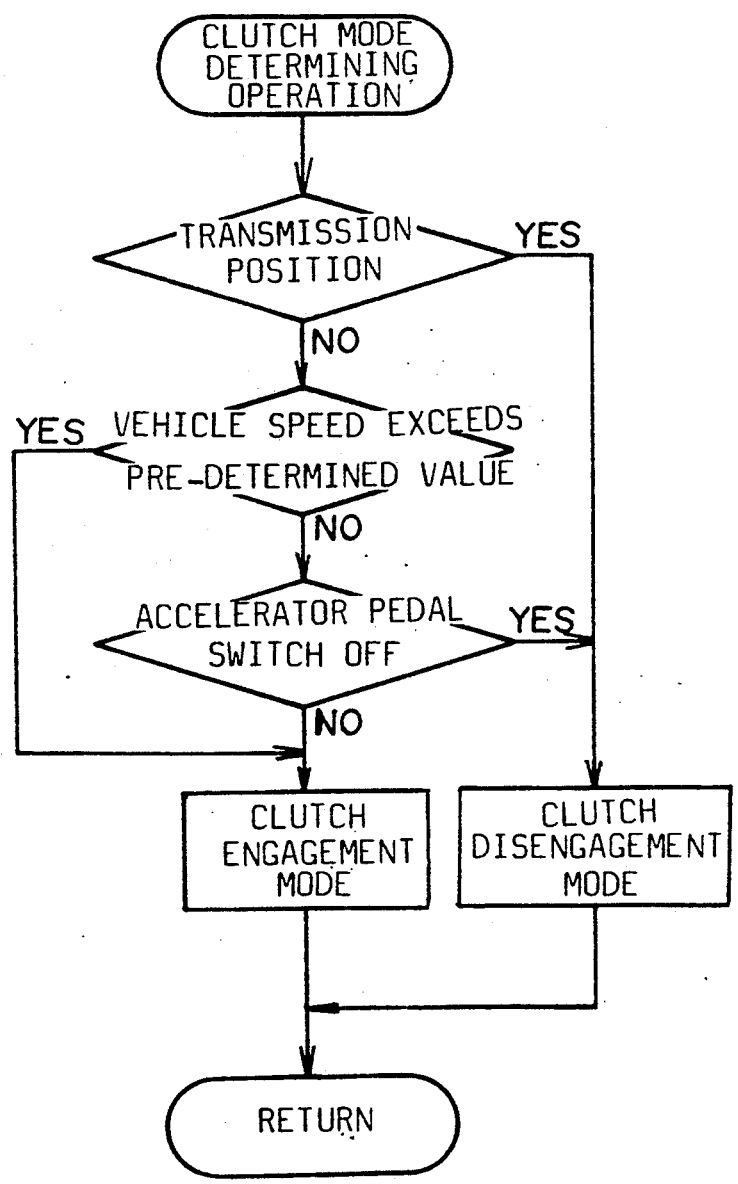

CONTROL SYSTEM FOR A CLUTCH OF A MOTOR VEHICLE

BACKGROUND OF THE INVENTION

The present invention relates to a control system for a dry-plate friction clutch of a motor vehicle, and more particularly to a system where a position of a pressure plate of the clutch is estimated in accordance with a desired speed for shifting the pressure plate.

A torque converter, an electromagnetic clutch and a mechanical dry-plate friction clutch are employed as a clutch for connecting or disconnecting an engine with a transmission of the motor vehicle. It has been proposed to provide a dry-plate friction clutch which is electronically controlled to be engaged for starting the vehicle and to be released before stopping of the vehicle Japanese Patent Publication 62-47742 discloses a clutch control system where an engine speed changing rate at the start of a vehicle is detected to control the clutch. When the changing rate is positive, the clutch is operated to be engaged. When the changing rate is negative, the operation of the clutch is stopped to maintain the clutch at that position.

However, since the control system does not detect partial engagement of the clutch, the control of the clutch depends largely on the engine speed and the changing rate thereof. Namely, when the engine speed rapidly increases, the clutch is suddenly engaged, thereby causing hunting. On the other hand, when the engine speed gradually increases, the clutch is slowly operated from the disengagement state to the partial engagement state, which impairs starting characteristics.

Japanese Patent Application Laid-Open 59-124438 discloses a control system having a pressure plate position sensor for detecting the position of the pressure plate at the state of the engagement and the position at complete engagement. The pressure plate is shifted in each range divided by the positions at a speed predetermined for the range.

The provision of the pressure plate position sensor causes an increase in the manufacturing cost of the clutch.

Another problem is that an exact starting point of partial engagement is not detected when there is wear or a small thickness difference of the clutch plate.

SUMMARY OF THE INVENTION

The object of the present invention is to provide a system for controlling a dry-plate friction clutch where the positions of a pressure plate are accurately estimated from a desired shifting speed of the pressure plate so as to precisely control the clutch.

A reference shifting speed of the pressure plate is calculated in accordance with a model equation dependent on the desired shifting speed to obtain the position of the pressure plate. The error between the reference and desired positions is further corrected.

According to the present invention, there is provided a control system for a clutch of a motor vehicle, the system comprising a detector for detecting conditions of the clutch, an engine, a transmission, and the vehicle and for producing an operating condition signal, desired speed providing means responsive to the operating condition signal for providing a desired shifting speed for shifting a pressure plate of the clutch, estimating means for estimating a reference shifting speed based on the desired shifting speed, a position calculator for integrating the reference shifting speed and for producing a position of the pressure plate, and control means for controlling the speed of the pressure plate based on the position of the pressure plate.

The other objects and features of the present invention will become understood from the following description with reference to the accompanying drawings.

BRIEF DESCRIPTION OF DRAWINGS

FIG. 3c is a graph explaining a model equation for obtaining a pressure plate position;

FIG. 5 is a flowchart describing a routine for determining a clutch mode;

DETAILED DESCRIPTION OF THE PREFERRED EMBODIMENTS

Figure 1:
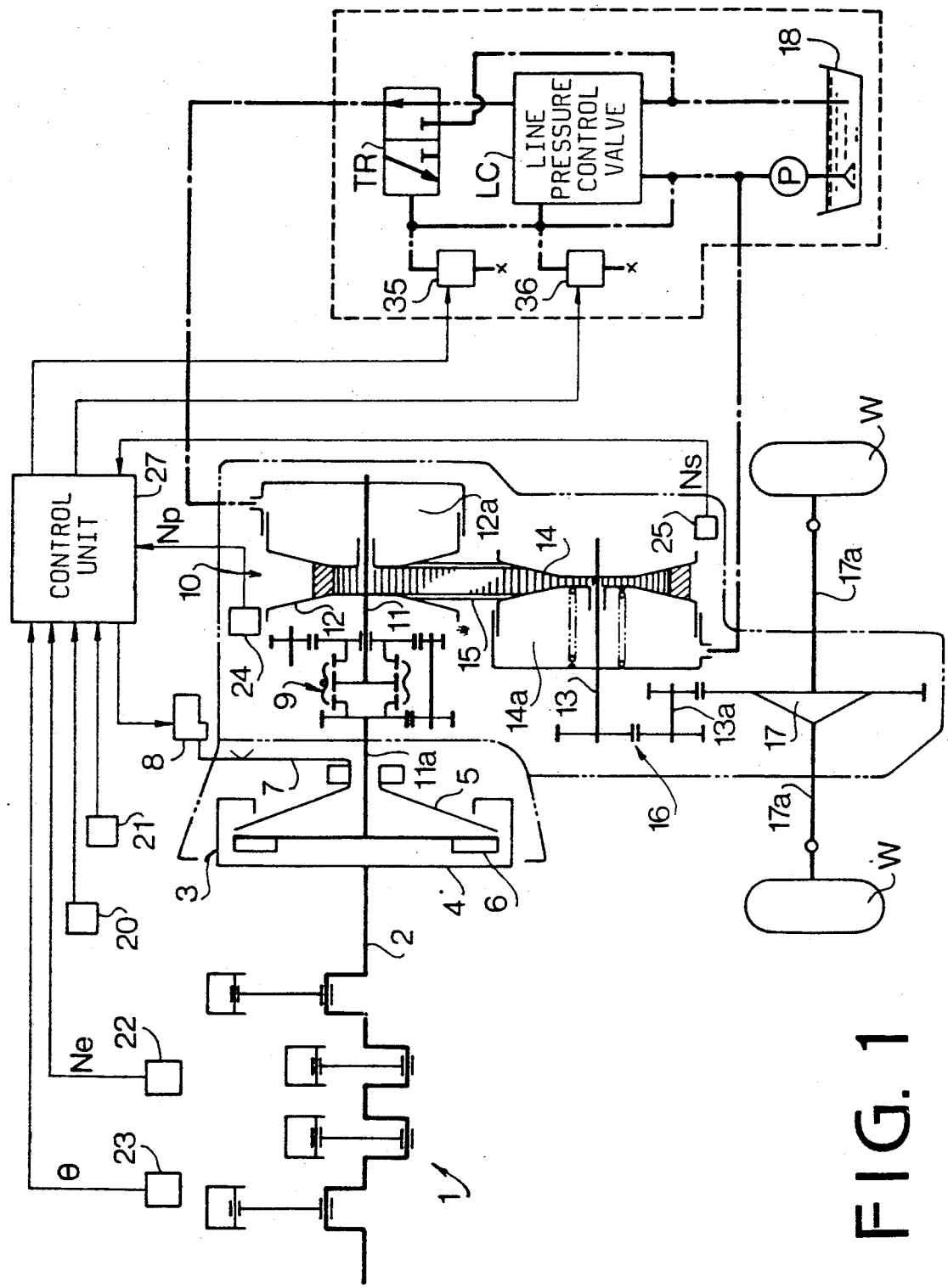
FIG. 1 is a schematic illustration of a system for controlling a friction clutch for a motor vehicle.

Referring to FIG. 1, a crankshaft 2 of an engine 1 is operatively connected to a dry-plate friction clutch 3 for transmitting power of the engine 1 to a continuously variable belt-drive automatic transmission 10 through a selector mechanism 9. An output of the belt-drive transmission 10 is transmitted to axles 17a of vehicle driving wheels W through an output shaft 13, a pair of intermediate reduction gears 16, an intermediate shaft 13a, and a differential 17.

The clutch 3 comprises a flywheel 4 connected to the crankshaft 2 of the engine 1, a pressure plate 6 disposed opposite to the flywheel 4 and secured to an input shaft 11a of the transmission 10, and a diaphragm spring 5. The diaphragm spring 5 is operated by a release lever 7 connected with a DC motor 8 as an actuator. The DC motor 8 is actuated by drive pulses, and the rotation thereof is converted into a rectilinear motion by a converting device so as to linearly shift the release lever 7. When the drive pulses are cutoff, the rotation of the DC motor 8 is stopped by a braking device provided therein to hold the release lever 7 at the position. For example, when the DC motor 8 is rotated in one direction, the diaphragm spring 5 is actuated by the release lever 7 to push the pressure plate 6 against the flywheel 4. Thus, the clutch 3 is mechanically engaged by a frictional force, thereby transmitting the output of the crankshaft 2 to the input shaft 11a. On the other hand, when the DC motor 8 is rotated in the opposite direction, the clutch 3 is disengaged. The duty ratio of the drive pulses applied to the motor 8 is variable so as to control the shifting speed.

In the belt-drive automatic transmission 10, the selector mechanism 9 is provided between the input shaft 11a and a main shaft 11. The selector mechanism 9 is provided with a synchromesh mechanism comprising gears, a hub, and a sleeve for connecting the input shaft 11a and the main shaft 11 to selectively provide a driving position (D-range), a neutral position (N-range) and a reverse driving position (R-range).

The continuously variable belt-drive automatic transmission 10 has the main shaft 11 and the output shaft 13 provided in parallel with the main shaft 11. A drive pulley 12 provided with a hydraulic cylinder 12a is mounted on the main shaft 11. A driven pulley 14 provided with a hydraulic cylinder 14a is mounted on the output shaft 13. A drive belt 15 engages the drive pulley 12 and the driven pulley 14. Hydraulic cylinders 12a and 14a are communicated with an oil hydraulic control circuit. The cylinder 12a is supplied with pressurized oil by an oil pump P from an oil reservoir 18 passing through a line pressure control valve LC and a transmission ratio control valve TR. The cylinder 14a is applied with pressurized oil from the pump P. The hydraulic control circuit is responsive to vehicle speed, engine speed and a throttle valve position for controlling the amount of oil supplied to the cylinders 12a and 14a. The pulleys 12 and 14 are operated by compressive forces of cylinders so that the running diameter of the belt 15 is varied to infinitely change the transmission ratio (i).

An electronic control system for the clutch 3 and the belt-drive transmission 10 has an engine speed sensor 22, and rotating speed sensors 24 and 25 for respectively sensing rotating speeds of the drive pulley 12 and the driven pulley 14. A selector lever connected to the selector mechanism 9 is provided with a select position sensor 20 for sensing a selected position of the transmission, namely the driving position (D), the neutral position (N) and the reverse position (R). An accelerator pedal switch 21 is provided for sensing the depression of an accelerator pedal, and a throttle position sensor 23 is provided.

Output signals of the sensors and pulses of the switches are applied to an electronic control unit 27 which produces and sends a control signal to the motor 8 and a control signal for controlling the transmission ratio (i) and a line pressure control signal to the control circuit.

Figure 2A:
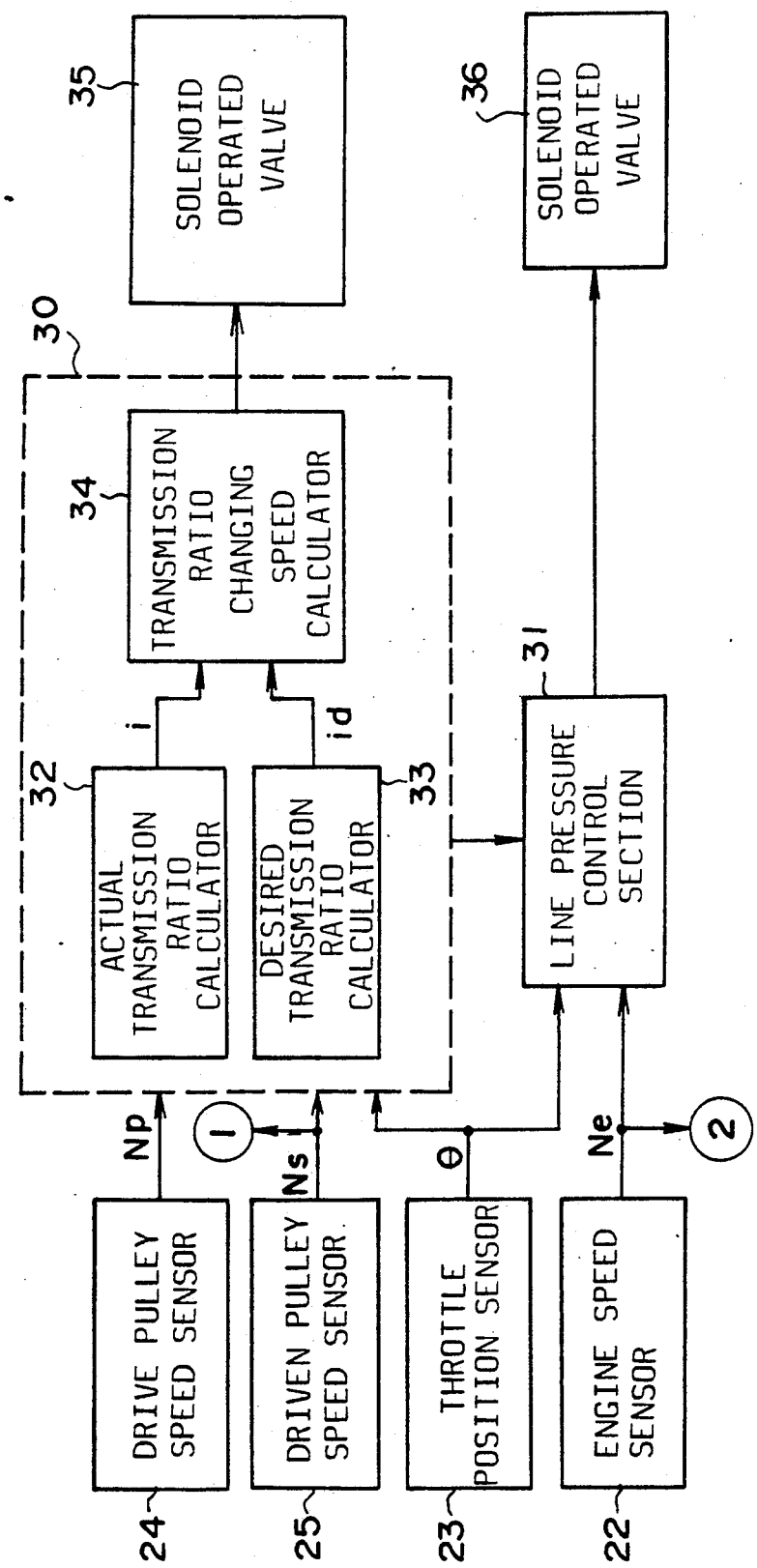
FIGS. 2a, 2b and 2c show a block diagram of a control unit according to the present invention.
Figure 2B:
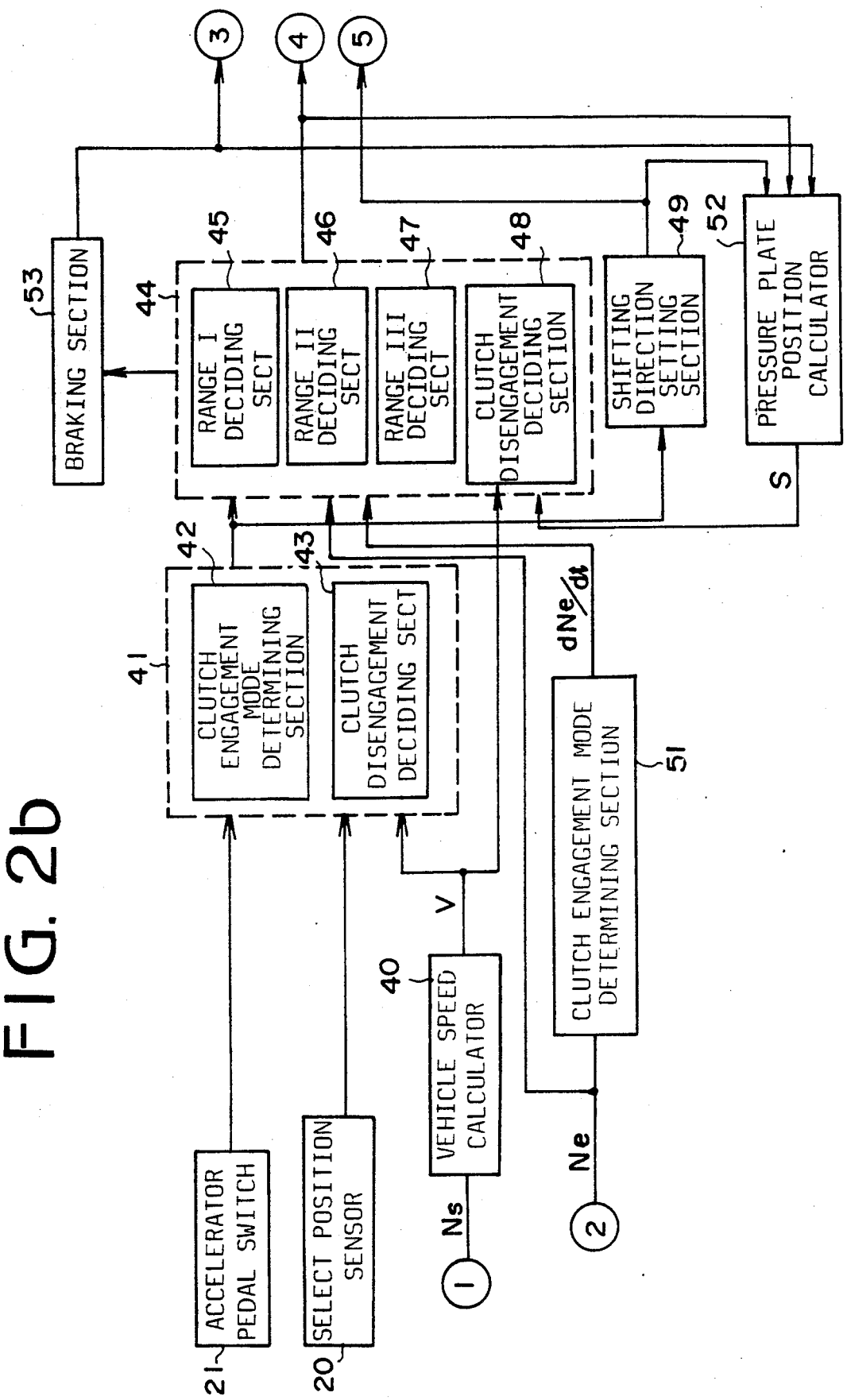
Figure 2C:
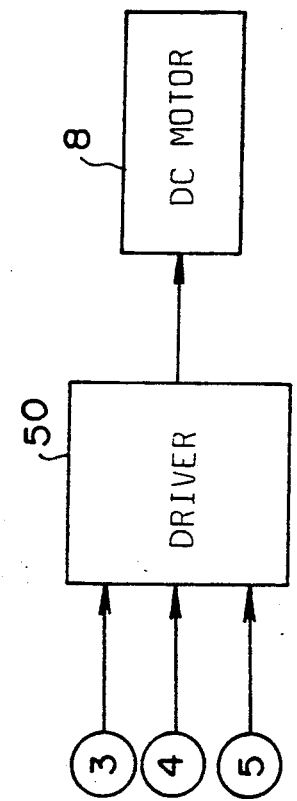

Referring to FIGS. 2a and 2b showing the control unit 27 of FIG. 1, a transmission ratio changing speed control section 30 comprises an actual transmission ratio calculator 32 to which output signals $N_P$ and $N_S$ of the sensors 24, 25 are fed to produce an actual transmission ratio i in accordance with $i = N_P/N_S$. The transmission changing speed control section 30 further has a desired transmission ratio calculator 33 where a desired transmission ratio id is calculated in accordance with a desired drive pulley speed Npd, which is derived from a table, and the driven pulley speed $N_S$. The desired transmission ratio id is fed to a transmission ratio changing speed calculator 34 which produces a desired transmission ratio changing speed (rate) di/dt. The speed (rate) di/dt is the amount of change of the desired transmission ratio id during a predetermined time interval. A duty ratio signal dependent on the desired transmission ratio changing speed (rate) di/dt is applied to a solenoid operated valve 35. The valve 35 is provided in the hydraulic circuits, for shifting a spool of the transmission ratio control valve TR to control the transmission ratio i.

A line pressure control section 31 is applied with an engine speed signal Ne from the sensor 22 and throttle opening degree $\theta$ from the sensor 23 to obtain an engine torque T. A desired line pressure $P_{LD}$ is obtained in accordance with the engine torque T and the actual transmission ratio i. A duty ratio signal corresponding to the desired line pressure $P_{LD}$ is applied to a solenoid operated valve 36. The valve 36 is provided in the hydraulic circuit, for shifting a spool of the line pressure control valve LC to control the line pressure.

A system for controlling the clutch 3 is described with reference to FIG. 2b. The control unit comprises a clutch control mode determining section 41 applied with signals from the select position sensor 20, accelerator pedal switch 21 and a vehicle speed calculator 40 to which the driven pulley speed $N_S$ is fed to obtain vehicle speed V. The clutch control mode determining section 41 has a clutch engagement mode determining section 42 and a clutch disengagement mode determining section 43, which respectively applies as a mode signal an engagement signal and a disengagement signal to a desired shifting speed providing section 44 for the pressure plate and to a shifting direction setting section 49. The clutch engagement mode determining section 42 determines engagement of the clutch when the accelerator switch 21 is closed at D-range or R-range or when the vehicle speed V is higher than a predetermined value $V_1$.

On the other hand, the disengagement of the clutch 3 is decided at the clutch disengagement mode determining section 43 when a parking range (P-range) or a neutral range (N-range) is selected, or when the vehicle is driven while the accelerator pedal is released at the D-range or the R-range.

The desired shifting speed providing section 44 produces a desired shifting speed pattern signal for shifting the pressure plate 6 in accordance with the vehicle speed V from the vehicle speed calculator 40, the engine speed Ne from the engine speed sensor 22, engine speed changing rate dNe/dt calculated based on the engine speed Ne in an engine speed changing rate calculator 51, and a clutch position S determined dependent on the shifting speed and the shifting direction of the pressure plate 6 and on whether the motor 8 is braked or not. The shifting speed pattern signal from the desired shifting speed providing section 44 and a shifting direction signal from the shifting direction setting section 49 are fed to the DC motor 8 through a driver 50.

Figure 3A:
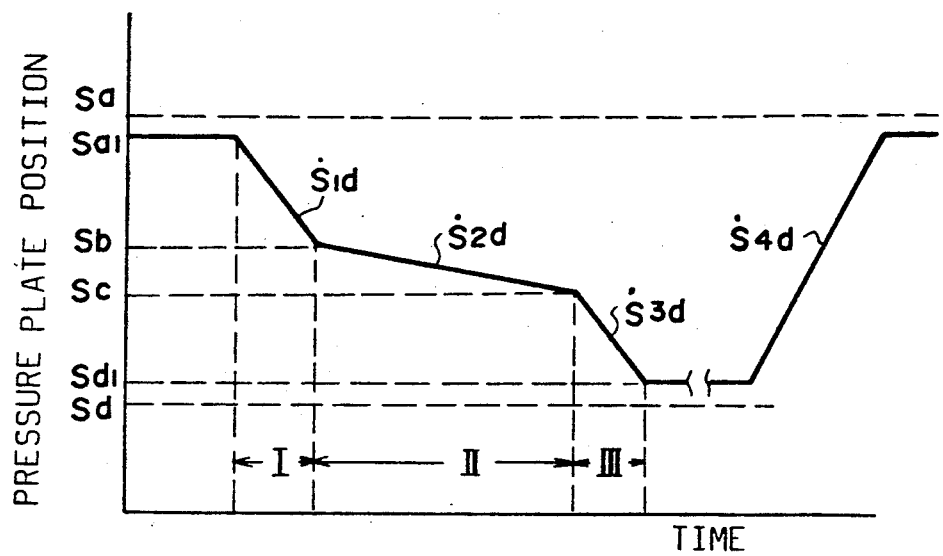
FIG. 3a is a graph showing clutch engagement ranges.

As shown in FIG. 3a, a clutch disengagement position Sa and clutch engagement position Sd, which are two limit positions of the pressure plate 6, an engagement start position Sb and an complete engagement position Sc between the limit positions are determined beforehand. The engagement state is divided into three ranges where a range I is a complete disengagement range between the pressure plate positions Sa and Sb, a range II is a partial engagement range between the pressure plate positions Sb and Sc and a range III is a complete engagement range between the pressure plate positions Sc and Sd.

The desired shifting speed providing section 44 has a range I determining section 45, a range II determining section 46, a range III determining section 47 and a clutch disengagement determining section 48. When the clutch engagement mode is determined in the clutch engagement mode determining section 42, one of the range determining sections 45 to 47 is selected in accordance with the pressure plate position S, engine speed changing rate dNe/dt, vehicle speed V and clutch engagement period.

On the other hand, if the clutch disengagement mode is determined in the clutch disengagement mode determining section 43, the clutch disengagement deciding section 48 is selected to provide a desired motor speed to disengage the clutch.

Figure 3B:
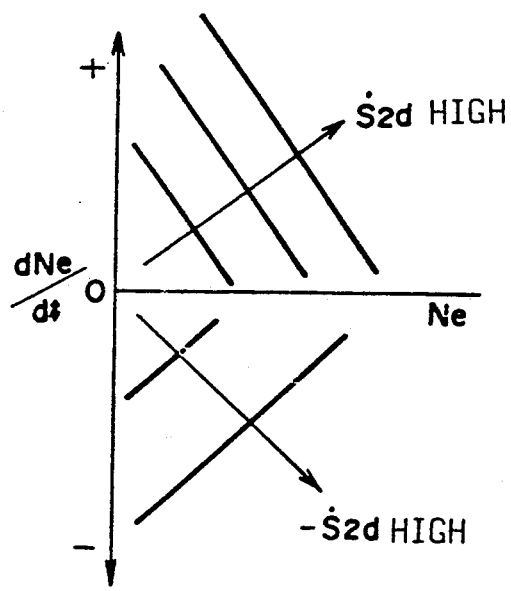
FIG. 3b is a graph showing a relationship among shifting speed, engine speed and engine speed changing rate.

Desired shifting speeds $S_{1d}$, $S_{3d}$ and $S_{4d}$ are provided for the range I determining section 45, the range II determining section 46 and the clutch disengagement section 48 as maximum values, respectively. To the contrary, a desired shifting speed $S_{2d}$ for the range II determining section 47 is derived from a look-up table in accordance with the engine speed Ne and the engine speed changing rate dNe/dt. As shown in FIG. 3b, the shifting speed $S_{2d}$ is an increasing function of the engine speed Ne and engine speed changing rate dNe/dt. Thus, the motor shifting speed $S_{2d}$ increases with an increase of the engine speed Ne and with an increase of the engine speed changing rate dNe/dt. When the changing rate becomes smaller than zero, that is when the engine speed decreases, the motor is rotated in a reverse direction to release the engagement of the clutch.

When the pressure plate reaches the engagement limit position or the disengagement limit position, the converting device for converting the rotation of the motor 8 into the rectilinear motion may be locked, thereby preventing pressure plate 6 from being shifted when the motor 8 is again actuated. In order to avoid locking of the device, a braking section 53 is provided, to which the desired shifting speed signal from the desired shifting speed providing section 44 is applied. When the pressure plate 6 is shifted at the maximum speeds $\dot{S}_{3d}$ or $\dot{S}_{4d}$ to stop positions $\dot{S}_{q1}$ and $\dot{S}_{d2}$ immediately before the limit positions Sa and Sd, the braking section 53 applies a brake signal to the driver 50 to forcibly render the speeds $\dot{S}_{3d}$ and $\dot{S}_{4d}$ zero, thereby braking the motor 8.

The pressure plate position calculator 52 is applied with the output signal of the braking section 53, the shifting speed signal from the desired shifting speed providing section 44 corresponding to the speed $\dot{S}_{1d}$ to $\dot{S}_{4d}$, and the shifting direction signal from the shifting direction setting section 49. Since the pressure plate has inertia and is actually moved with a first order lag, an actual shifting speed $\dot{S}$ is calculated in accordance with a model equation as follows.

$$\dot{S}_n = \{\dot{S}_d - \dot{S}(n-1)\} \times \{1 - \epsilon^{-(\Delta t/\tau)}\} + \dot{S}(n-1)$$

where Sd is a desired shifting speed, $\tau$ is a time constant and $\Delta t$ is an operation interval. Thus, the actual speeds $\dot{S}_1$ to $\dot{S}_4$ of the pressure plate 6 are estimated based on the desired speeds $\dot{S}_{1d}$ to $\dot{S}_{4d}$.

Referring to FIG. 3c, the position S of the pressure plate 6 is calculated by integrating the estimated actual speeds $\dot{S}_1$ to $\dot{S}_4$ namely, by calculating the area of the hatched region. The time constant $\tau$ is derived from a table in dependency on the pressure plate position S. The position S, which corresponds to one of various positions such as the disengagement limit position Sa, the engagement start position Sb, the entire engagement position Sc and engagement limit position Sd, is stored at a predetermined address of a memory and rewritten as the pressure plate is shifted. Considering that the DC motor 8 rotates with inertia although the shifting speed $\dot{S}_{3d}$ or $\dot{S}_{4d}$ is zero when the pressure plate 6 nears the limit positions, the pressure plate position S is corrected as follows.

$$S \rightarrow S - \Delta t \cdot CONST$$

The operation of the control system of the clutch is described hereinafter with reference to FIGS. 4 to 8.

Figure 4:
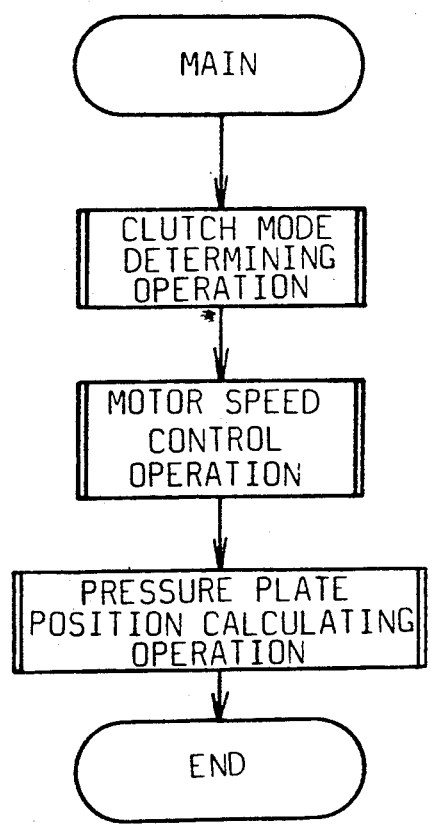
FIG. 4 is a flowchart describing a main routine for controlling the clutch.

Referring to FIG. 4 showing the main routine of the operation, the routine comprises determining operation of the clutch mode, control operation of the shifting speed and calculating operation of the pressure plate position. FIG. 5 shows a sub-routine for determining the clutch mode.

When the N- range or the P-range is selected, the disengagement of the clutch 3 is decided at the clutch disengagement deciding section 43. If the vehicle speed (driven pulley speed) V is higher than the predetermined speed $V_1$, it is determined at the clutch engagement determining section 42 that the clutch is to be entirely engaged. On the other hand, if the vehicle speed is lower than the speed $V_1$, and the accelerator switch 21 is closed, the engagement state is also decided. When the accelerator pedal switch 21 is open, the clutch is disengaged.

Figure 6A:
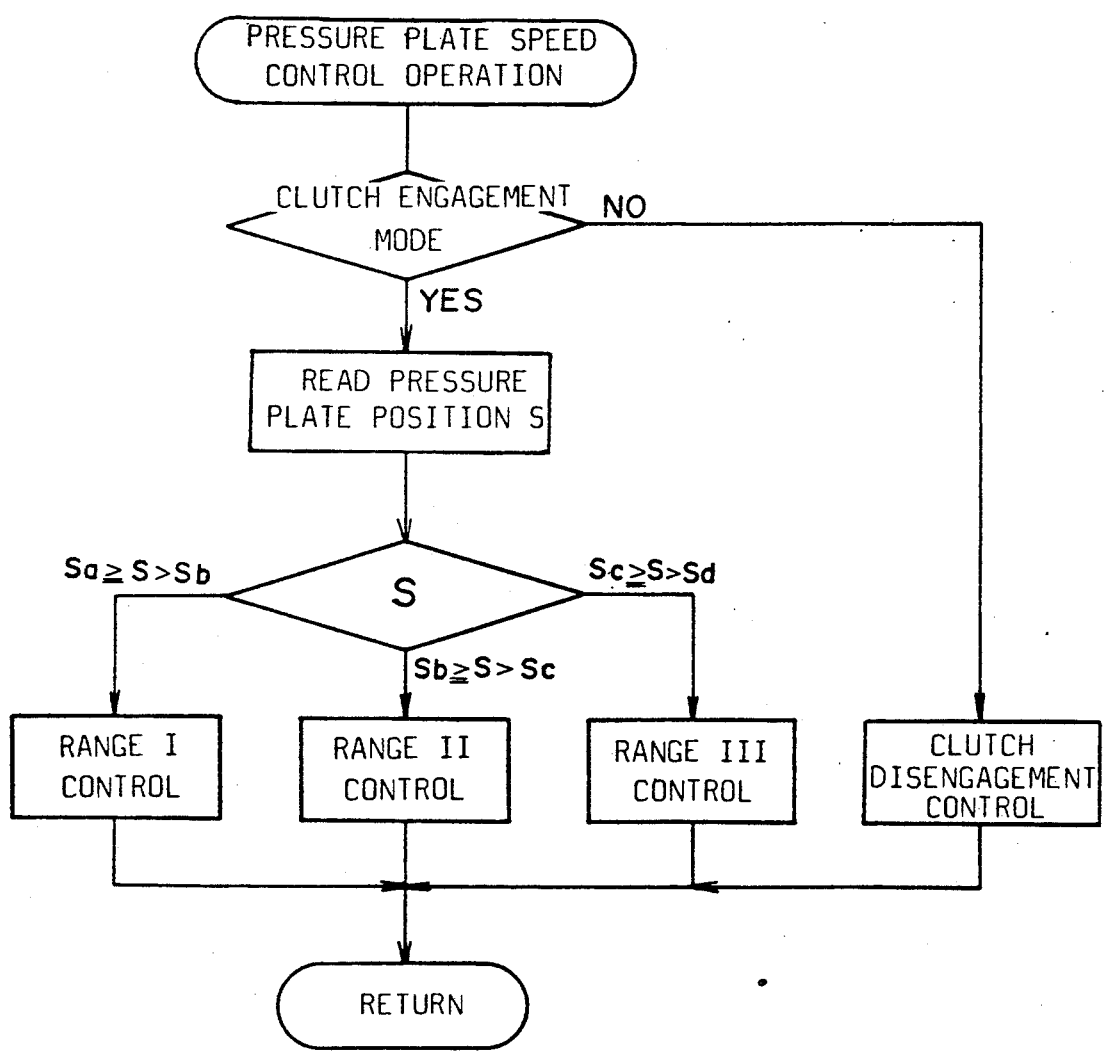
FIG. 6a is a flowchart describing a routine for determining a shifting speed.
Figure 6B:
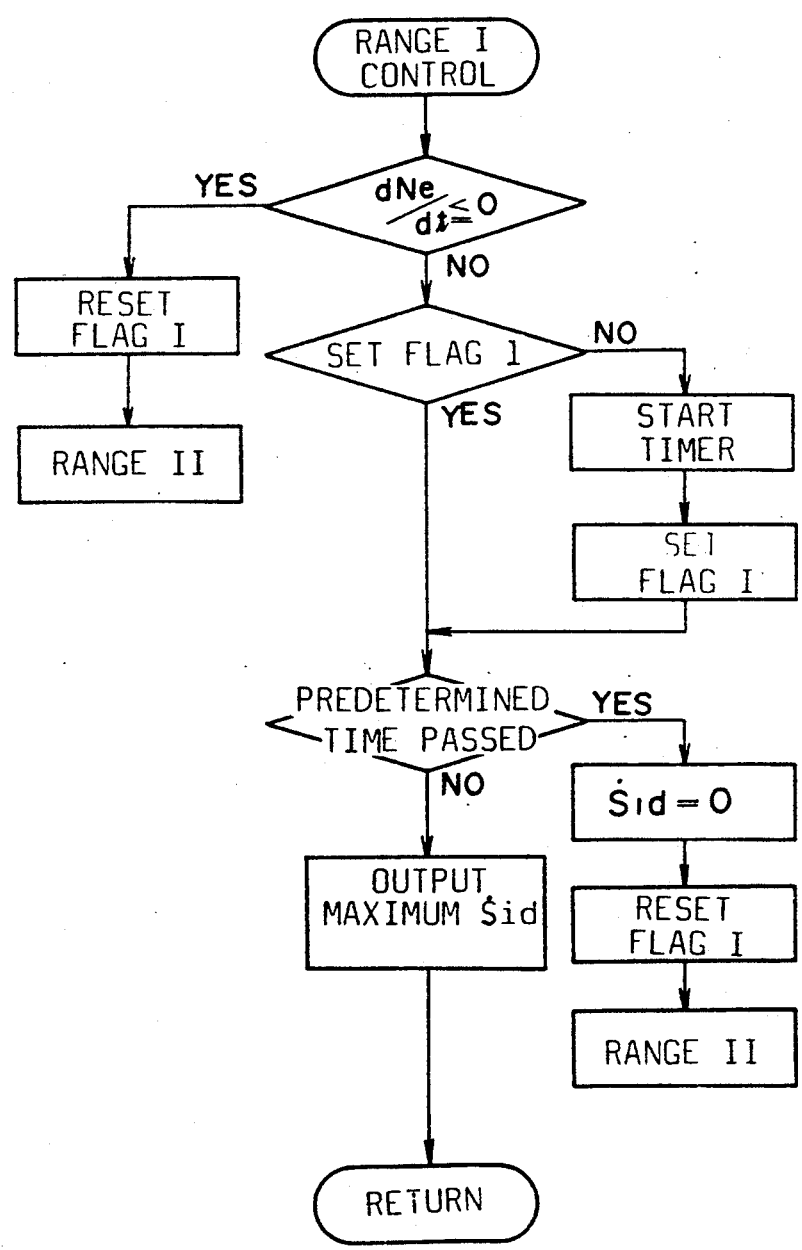
FIGS. 6b to 6d show flowcharts describing operations in clutch partial engagement states.

When the clutch engagement mode is determined, the operation for obtaining the desired shifting speed is carried out as shown in FIG. 6a. The pressure plate position S calculated by the pressure plate position calculator 52 and stored in the memory is read out and the zone I, II or III is selected dependent on the position S. At the start of the vehicle, since the pressure plate is positioned between the clutch disengagement limit position Sa and the clutch engagement start position Sb (Sa≧S>Sb), the range I is selected thereby performing a routine shown in FIG. 6b.

While the engine speed Ne increases (dNe/dt<0), the desired shifting speed $S_{1d}$ is set at the maximum value. The shifting speed signal representing the maximum speed $\dot{S}_{1d}$ and the shifting direction signal representing a signal for shifting the pressure plate 6 in the engaging direction from the shifting direction setting section 52 are applied to the driver 50 to drive the DC motor 8. Therefore, the pressure plate 6 is rapidly shifted to the position Sb.

Figure 6D:
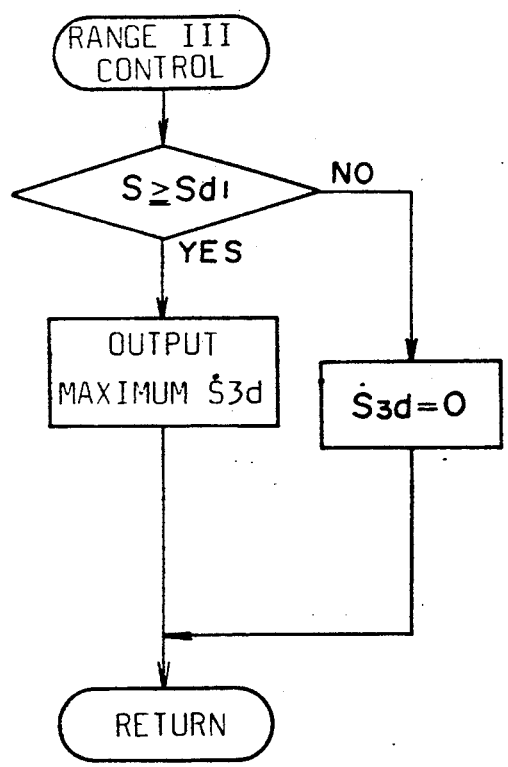
Figure 6C:
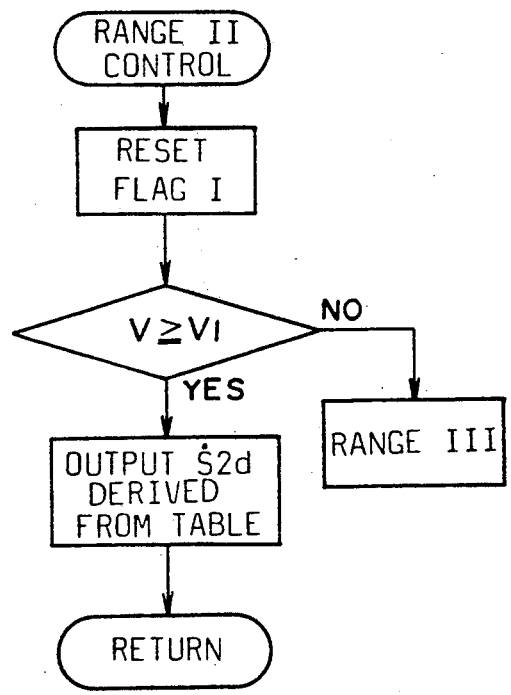
Figure 8:
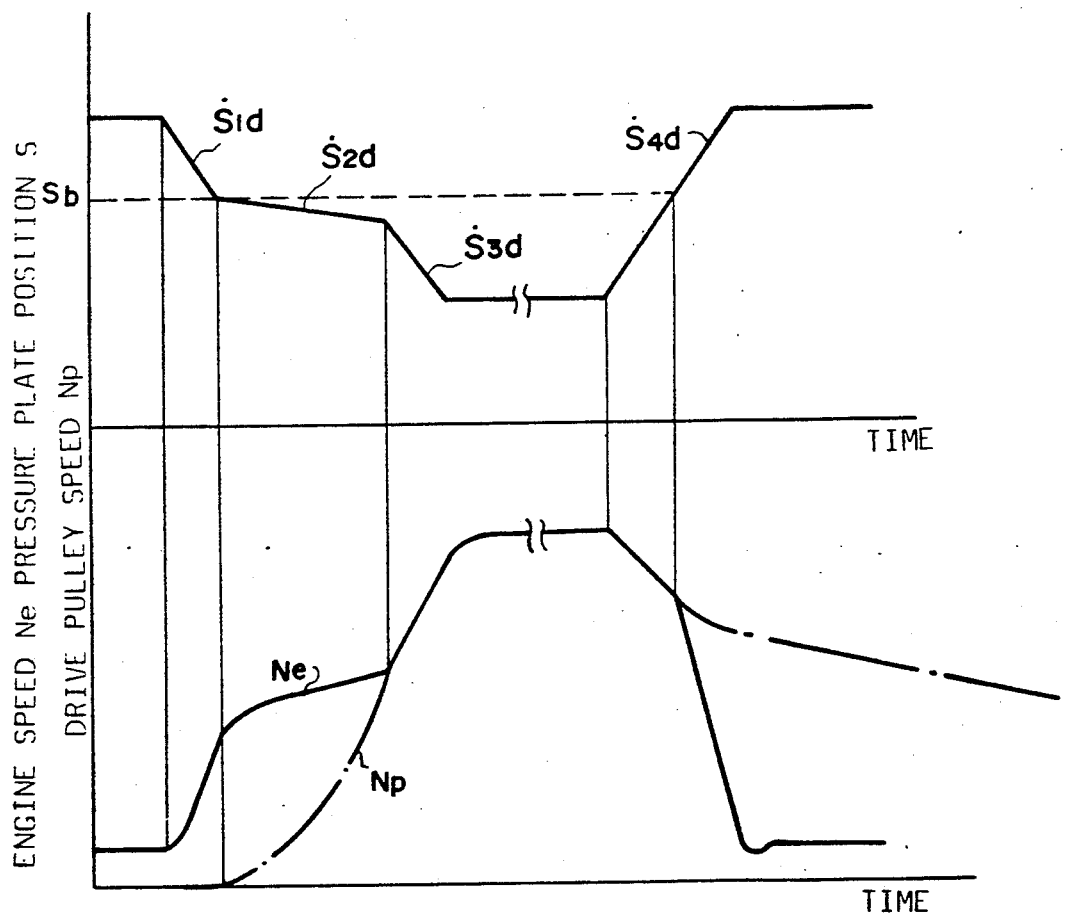
FIG. 8 is a graph showing the variation of pressure plate position.

When the pressure plate 6 passes the position Sb (Sb≧S>Sc), or the engine speed decreases (dNe/dt≦0) in the range I, or a predetermined time passed after entering the range I, the range II is selected to perform the operation shown in FIG. 6c. In the range II, the drive pulley speed Np rapidly increases as shown in FIG. 8. While the engine speed Ne is high and the engine speed changing rate dNe/dt is large, the desired shifting speed $\dot{S}_{2d}$ increases to speed up the engagement. When the drive pulley speed Np increases, the engine speed changing rate dNe/dt reduces, and the desired speed $\dot{S}_{2d}$ consequently decreases to slowly shift the pressure plate 6 toward the engagement position. Thus, the clutch 3 is partially engaged so as to gradually cause the drive pulley speed Np to converge to the engine speed Ne.

When the engine speed Ne equals the drive pulley speed Np, (Ne=Np), since the pressure plate 6 is positioned between the full engagement position Sc and the clutch engagement limit position Sa, the routine for the range III of FIG. 6d, is selected. Thus, the maximum desired shifting speed $\dot{S}_{3d}$ is determined, thereby quickly shifting the pressure plate 6 to completely engage the clutch 3. When the pressure plate 6 reaches the pressure plate stop position $S_{d1}$ immediately before the limit position Sd, the braking section 53 applies the brake signal to the driver 50 to decrease the desired speed $\dot{S}_{3d}$ to zero. The motor 8 is accordingly braked to stop the pressure plate 6 at the limit position Sd. As shown in FIG. 6c, the range II is selected when the vehicle speed V exceeds the predetermined speed $V_1$ ($V \geq V_1$).

Thus, the pressure plate 6 is shifted at the speeds $\dot{S}_{1d}$ to $\dot{S}_{3d}$ to shift the pressure plate 6 between the positions $Sa_1$ and $Sd_1$ with a delay caused by the inertia of the clutch operating device. As the pressure plate 6 moves, the position S thereof is calculated in accordance with a routine shown in FIG. 7 by the clutch position calculator 52. In the routine, the operational interval $\Delta t$ for executing the main routine is calculated. During the shifting of the pressure plate 6, the actual shifting speeds $\dot{S}_1$ to $\dot{S}_3$ are calculated in accordance with the model equation of first order lag. The actual shifting speeds are integrated to obtain the pressure plate position S. Therefore, the pressure plate position S coincides with the actual position of the pressure plate despite the delay in shifting of the pressure plate. The engagement start position Sb and the entire engagement position Sc are precisely detected, thereby enabling accurate control of the clutch 3 in each range.

Although the motor 8 is applied with the brake signal, the pressure plate 6 is shifted by the inertia of the motor 8. An error in the calculated position S caused by such a shifting is corrected so that the pressure plate 6 can be accurately controlled to stop at the stop position $Sd_1$.

When the clutch 3 is engaged, the power of the engine is transmitted to the continuously variable transmission 10 controlled by the transmission changing speed control section 30 and the line pressure control section 31 to start the vehicle.

Figure 6E:
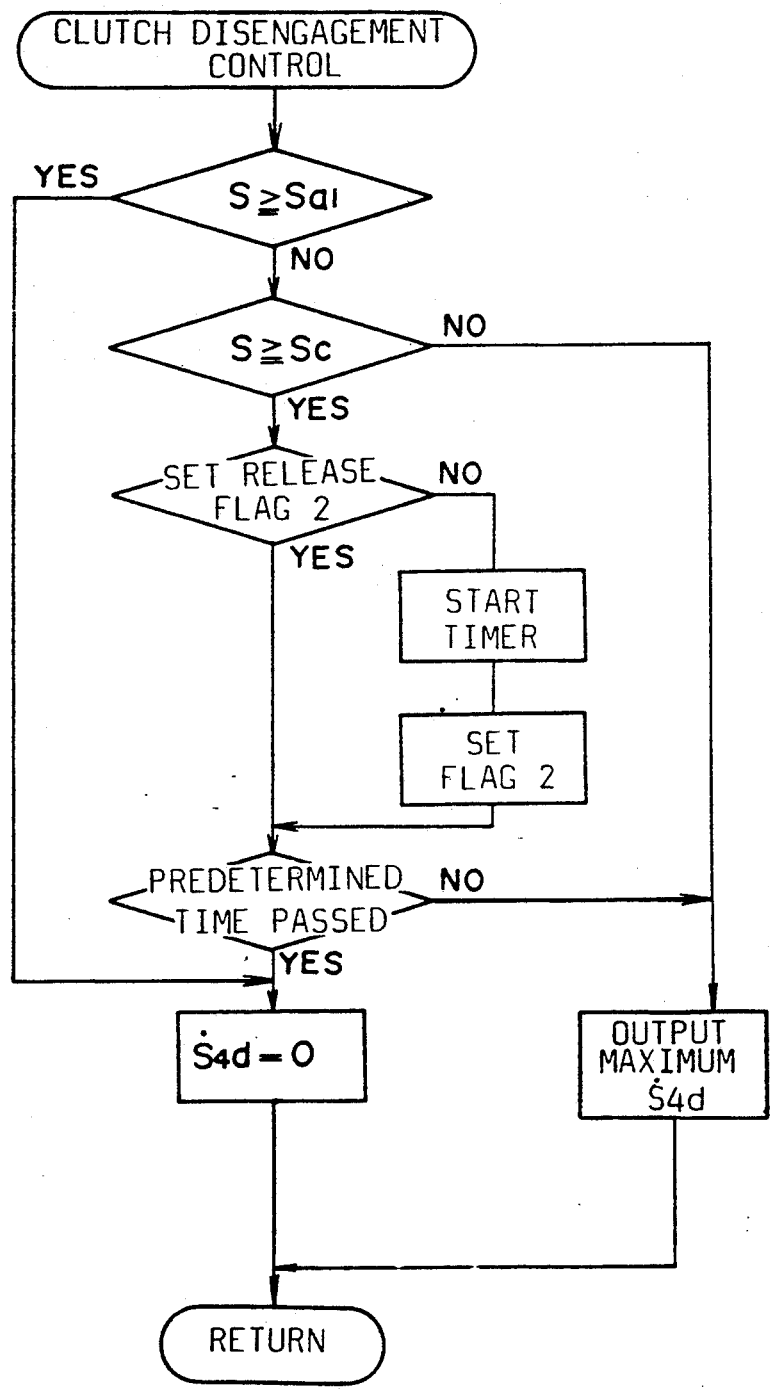
FIG. 6e is a flowchart describing a routine in a clutch release state.
Figure 7:
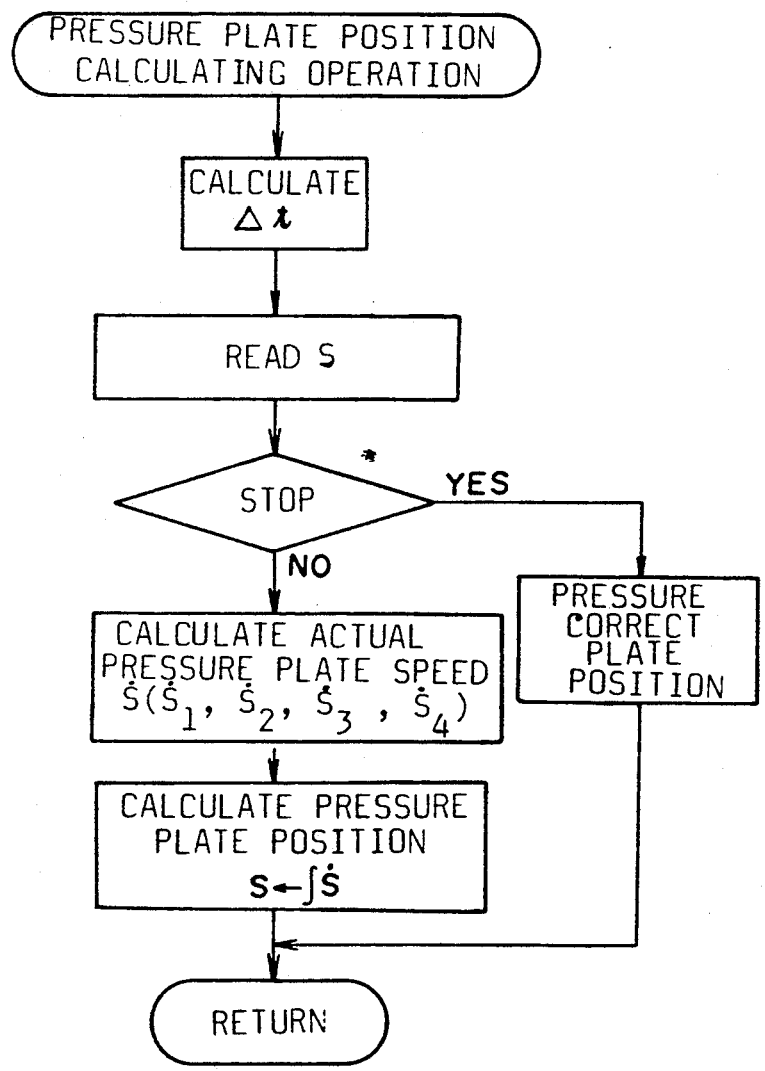
FIG. 7 is a flowchart showing operation for obtaining pressure plate position.

When the accelerator pedal is released, thereby opening the accelerator pedal switch 21, the clutch disengagement mode is selected as shown in FIG. 5. The routine for the clutch disengagement control is shown in FIG. 6e. When the pressure plate 6 is at an engagement side of the complete engagement position Sc ($S \leq Sc$), the maximum shifting speed $\dot{S}_{4d}$ is provided and the shifting direction setting section 49 produces the disengagement direction signal. The motor 8 rotates in the disengaging direction at a high speed so that the pressure plate 6 is rapidly shifted to disengage the clutch 3. When the clutch 6 reaches the engagement start position Sb ($Sb \geq S > Sc$) a timer is set. When the pressure plate 6 passes the stop position $Sa_1$ ($S \geq Sa_1$), the desired shifting speed $S_{4d}$ becomes zero to brake the motor 8 so that the clutch 3 is held in the disengagement state. If a predetermined time passes after the timer is set, the motor 8 is also stopped even though the pressure plate 6 has not yet reached the position $Sa_1$. The clutch 3 is thus released for deceleration before the vehicle stops, to prevent the engine from stalling.

The clutch position S is also calculated dependent on the model equation and corrected during the disengagement operation.

The present invention may be applied to a clutch control system provided with a hydraulic cylinder as an actuator of the clutch.

From the foregoing, it will be understood that in accordance with the present invention, there is provided a system for controlling a dry-plate friction clutch where the clutch is rapidly and smoothly operated based on a calculated actual clutch position. The actual pressure plate position is accurately calculated based on a desired and actual shifting speed of the pressure plate from a model equation. Thus a sensor for detecting the position of the pressure plate can be obviated, thereby decreasing manufacturing cost and preventing error caused by the sensor. The clutch is prevented from locking when a motor is used as the actuator of the clutch. The actual clutch position is corrected in consideration of the inertia of the motor at braking thereof, so that an accurate actual position of the clutch can be obtained.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In a control system of a clutch for transmitting power of an engine to driving wheels of a motor vehicle having a continuously variable transmission interposed between said clutch and said driving wheels, the control system comprising an accelerator pedal switch for detecting a position of an accelerator pedal and for generating an accelerator pedal position signal, a select position sensor provided on said transmission for detecting a selected position of the transmission and for producing a select position signal, an engine speed sensor mounted on said engine for detecting engine speed and for producing an engine speed signal, and vehicle speed calculating means for sensing driven pulley speed of a driven pulley of the continuously variable transmission and for generating a vehicle speed signal, and improvement in the system which comprises:

clutch control mode deciding means responsive to said accelerator pedal position signal, said select position signal and said vehicle speed signal for determining an engaging condition of said clutch in dependency on driving conditions of said vehicle and for generating a mode signal;

clutch engagement mode determining means responsive to said engine speed signal for determining an engine speed changing rate corresponding to said engine speed and for producing an engine speed changing rate signal;

shifting speed setting means responsive to said mode signal, said vehicle speed signal and said engine speed signals for deciding clutch engagement and disengagement patterns in accordance with said driving conditions and for producing a shifting speed pattern signal;

pressure plate position calculating means responsive to said shifting speed pattern signal for calculating a pressure plate position of said clutch by integrating said pattern signal and for producing a position signal applied to said shifting speed setting means; and control means responsive to said position and pattern signals for controlling said clutch in a predetermined model pattern corresponding to each driving condition so as to rapidly and smoothly operate said clutch without locking.

2. The control system as set forth in claim 1, wherein said clutch is a dry-plate friction clutch.

3. The control system as set forth in claim 1, further comprising:

a shifting direction setting section responsive to said mode signal for producing a shifting direction signal, and said control means and said pressure plate position calculating means are further responsive to said shifting direction signal.

4. The control system as set forth in claim 3, further comprising:

a braking section responsive to said shifting speed speed pattern signal for applying a brake signal to said control means and said pressure plate position calculating means when the pressure plate of the clutch is shifted at maximum speeds to stop positions immediately before limit positions of the pressure plate.

5. The control system as set forth in claim 1, wherein said pressure plate position calculating means calculates an estimated actual shifting speed of the pressure plate of the clutch from said pattern signal in accordance with a model equation dependent on a desired shifting speed of the pressure plate, a time constant and an operation interval, and then integrates said estimated actual shifting speed to produce said position signal.

6. The control system as set forth in claim 1, wherein said shifting speed setting means comprises a plurality of range determining means which are respectively selected to produce corresponding desired pressure plate shifting speeds as said shifting speed pattern signal, in accordance with said position signal, said mode signal, said vehicle speed signal and said engine speed signals.

7. A method for controlling a clutch for transmitting power of an engine to driving wheels of a motor vehicle having a continuously variable transmission interposed between the clutch and the driving wheels, the control system comprising an accelerator pedal switch for detecting a position of an accelerator pedal and for generating an accelerator pedal position signal, a select position sensor provided on said transmission for detecting a selected position of the transmission and for producing a select position signal, an engine speed sensor mounted on said engine for detecting engine speed and for producing an engine speed signal, and vehicle speed calculating means for sensing driven pulley speed of a driven pulley of the continuously variable transmission and for generating a vehicle speed signal, the method comprising the steps of:

determining an engaging condition of the clutch in dependency on driving conditions of said vehicle and generating a mode signal responsive to said accelerator pedal position signal, said select position signal and said vehicle speed signal;

determining an engine speed changing rate corresponding to said engine speed and for producing an engine speed changing rate signal in response to said engine speed signal;

deciding clutch engagement and disengagement patterns in accordance with said driving conditions and for producing a shifting speed pattern signal in response to said mode signal, said vehicle speed signal and said engine speed signals;

calculating a pressure plate position of the clutch by integrating said pattern signal and for producing a position signal in response to said shifting speed pattern signal; and controlling the clutch in a predetermined model pattern corresponding to each driving condition in response to said position and pattern signals, so as to rapidly and smoothly operate the clutch without locking.

* * * * *